(12) United States Patent
Ekberg

(10) Patent No.: US 9,961,075 B2
(45) Date of Patent: May 1, 2018

(54) IDENTITY BASED TICKETING

(75) Inventor: Jan-Erik Ekberg, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 45 days.

(21) Appl. No.: 14/389,017

(22) PCT Filed: Mar. 30, 2012

(86) PCT No.: PCT/FI2012/050326
§ 371 (c)(1),
(2), (4) Date: Dec. 28, 2014

(87) PCT Pub. No.: WO2013/144423
PCT Pub. Date: Oct. 3, 2013

(65) Prior Publication Data
US 2015/0312241 A1  Oct. 29, 2015

(51) Int. Cl.
*H04L 29/06* (2006.01)
*G06Q 50/30* (2012.01)
*G07B 15/02* (2011.01)
*G06F 17/30* (2006.01)
*H04L 12/26* (2006.01)

(52) U.S. Cl.
CPC ...... *H04L 63/083* (2013.01); *G06F 17/30353* (2013.01); *G06F 17/30424* (2013.01); *G06Q 50/30* (2013.01); *G07B 15/02* (2013.01); *H04L 43/106* (2013.01)

(58) Field of Classification Search
CPC .... H04L 12/585; H04L 12/5855; H04L 51/12
USPC ............................................ 726/9; 709/206
See application file for complete search history.

(56) References Cited

U.S. PATENT DOCUMENTS

| | | | | |
|---|---|---|---|---|
| 5,514,857 A | * | 5/1996 | Corless | ............. G07C 9/02 235/382 |
| 5,926,474 A | * | 7/1999 | Bolosky | ............. H04L 49/20 348/E5.008 |
| 7,139,679 B1 | * | 11/2006 | McGrew | ............. H04L 63/1458 702/186 |
| 7,331,060 B1 | * | 2/2008 | Ricciulli | ............. H04L 63/1458 709/227 |

(Continued)

FOREIGN PATENT DOCUMENTS

| | | |
|---|---|---|
| CN | 1871830 | 11/2006 |
| CN | 101403886 | 4/2009 |

(Continued)

OTHER PUBLICATIONS

Parayil, "More than Electronic Toll Booths: Singapore's Electronic Road Pricing Innovation", Jun. 2005, Prometheus, vol. 23, pp. 209-226.*

(Continued)

*Primary Examiner* — Morshed Mehedi
*Assistant Examiner* — Gregory Lane
(74) *Attorney, Agent, or Firm* — Harrington & Smith

(57) ABSTRACT

A system for identity based ticketing is provided, wherein a user device sends a challenge to a terminal; the terminal updates a filter based on the challenge and sends the contents of the filter to the user device. The user device sends the contents of the filter, relating to the user device and the terminal, to a backend server; and the backend server derives from the contents of the filter information concerning user behavior.

15 Claims, 4 Drawing Sheets

(56) References Cited

U.S. PATENT DOCUMENTS

| | | | |
|---|---|---|---|
| 7,415,424 B1* | 8/2008 | Donner | G06Q 10/02 235/382 |
| 7,693,797 B2 | 4/2010 | Ekberg | |
| 8,041,338 B2 | 10/2011 | Chen et al. | |
| 8,321,936 B1* | 11/2012 | Green | H04L 63/1416 718/1 |
| 9,015,476 B1* | 4/2015 | Juels | G06F 21/34 713/159 |
| 2002/0166048 A1* | 11/2002 | Coulier | H04L 63/0435 713/169 |
| 2003/0014315 A1* | 1/2003 | Jaalinoja | G06Q 20/045 705/18 |
| 2003/0204569 A1* | 10/2003 | Andrews | H04L 51/12 709/206 |
| 2004/0015554 A1* | 1/2004 | Wilson | G06Q 10/107 709/206 |
| 2006/0214767 A1* | 9/2006 | Carrieri | G07C 9/00158 340/5.61 |
| 2007/0038854 A1* | 2/2007 | Cheon | H04M 15/00 713/156 |
| 2007/0157322 A1* | 7/2007 | Onno | G07C 9/00007 726/28 |
| 2007/0174229 A1 | 7/2007 | Ismail | |
| 2007/0266130 A1* | 11/2007 | Mazur | G06Q 20/12 709/223 |
| 2008/0080563 A1* | 4/2008 | Kataria | H04J 3/0664 370/503 |
| 2008/0082821 A1* | 4/2008 | Pritikin | G06F 17/243 713/169 |
| 2008/0222694 A1* | 9/2008 | Nakae | H04L 63/20 726/1 |
| 2008/0256094 A1 | 10/2008 | Gupta et al. | |
| 2009/0089539 A1* | 4/2009 | Bunker | G06F 17/30657 711/216 |
| 2009/0133116 A1* | 5/2009 | Waisbard | G06F 21/10 726/17 |
| 2009/0312011 A1 | 12/2009 | Huomo et al. | |
| 2010/0077474 A1 | 3/2010 | Yacoub et al. | |
| 2010/0079250 A1* | 4/2010 | Fukushima | G06F 21/35 340/10.1 |
| 2010/0082491 A1* | 4/2010 | Rosenblatt | G06Q 10/02 705/65 |
| 2011/0099623 A1* | 4/2011 | Garrard | H04L 63/126 726/14 |
| 2011/0154030 A1* | 6/2011 | Hazra | G06F 21/88 713/164 |
| 2011/0215159 A1 | 9/2011 | Jain | |
| 2012/0011150 A1 | 1/2012 | Swaminathan et al. | |
| 2012/0239821 A1* | 9/2012 | Hozumi | H04L 67/1008 709/238 |
| 2013/0174217 A1* | 7/2013 | Ogawa | H04L 63/10 726/1 |
| 2013/0318603 A1* | 11/2013 | Merza | H04L 63/1441 726/22 |
| 2014/0013114 A1* | 1/2014 | Redpath | H04L 63/0428 713/168 |
| 2015/0312241 A1* | 10/2015 | Ekberg | G06Q 50/30 726/9 |

FOREIGN PATENT DOCUMENTS

| | | |
|---|---|---|
| EP | 0992954 | 4/2000 |
| EP | 1333409 | 8/2008 |
| EP | 2182489 A1 | 5/2010 |
| EP | 2182493 A1 | 5/2010 |
| GB | 2390211 | 12/2003 |
| JP | 2002324256 | 11/2002 |
| JP | 2004318317 | 11/2004 |
| JP | 2008269070 | 11/2008 |
| JP | 2009009541 | 1/2009 |
| JP | 2009037289 | 2/2009 |
| JP | 2011048424 | 3/2011 |
| JP | 2011242921 | 12/2011 |
| WO | 0117310 | 3/2001 |
| WO | 2009050322 | 4/2009 |
| WO | 2011/008889 A2 | 1/2011 |
| WO | WO2014179602 * | 11/2014 |

OTHER PUBLICATIONS

"Hoeft & Wessel Revolutionises E-Ticketing in Public Transport", Hoeft & Wessel, Retrieved on Dec. 8, 2014, Webpage available at: http://www.hoeft-wessel.com/nc/en/media-center/press-releases/press-release/article/hoeft-wessel-revolutioniert-e-ticketing-im-oeffentlichen-p/432/.

"NFC in Public Transport", NFC Forum, Jan. 2011, 33 pages.

International Search Report and Written Opinion received for corresponding Patent Cooperation Treaty Application No. PCT/FI2012/050326, dated Mar. 27, 2013, 17 pages.

Filter (higher-order function), Wikipedia article [online], Mar. 29, 2012, <URL:http://en.wikipedia.org/w/index.php.?title=Filter_(higher-order_function)&oldid=484495298>.

Extended European Search Report received for corresponding European Patent Application No. 12872448.1, dated Jul. 29, 2015, 6 pages.

* cited by examiner

IDENTITY BASED TICKETING

RELATED APPLICATION

This application was originally filed as PCT Application No. PCT/FI2012/050326 filed Mar. 30, 2012.

TECHNICAL FIELD

The present application generally relates to identity based ticketing.

BACKGROUND

Access to some transport systems is controlled using near-field communication (NFC) based devices used by passengers and reader devices that are mounted at entrances and/or exits. Some transport systems have automatic gates that open when a chip card is validated, some systems merely have a terminal that is tapped by the passenger device. In identity based systems, user identities are stored and associated with respective user accounts and electric tickets. The use of public transport is charged from the respective user account when use of the electric tickets at the gated or non-gated terminals is observed.

In identity based systems, the user identities are not as such used as tickets so as to mitigate the risk of identity theft by someone who might electrically eavesdrop communications between gated or non-gated terminals and passenger devices, or even use a malicious program for the purpose. Instead, electric tickets are produced such that the user identity is derivable from the electric ticket only by parties intended to do so. Furthermore, some passenger devices are provided with a secure environment for added security.

In some NFC identity based ticketing systems, the passenger device authenticates itself to the gated or non-gated terminal by communications over NFC interface, using standardized cryptographic techniques. Furthermore, in some systems, a constant communication between the passenger device and the transport authority server, either directly or through the terminal, is provided.

SUMMARY

According to a first example aspect of the invention, there is provided an apparatus comprising:
a first memory unit;
a first input/output interface; and
a first processor configured to:
receive a challenge from a user device;
update a filter based on the challenge; and
send the contents of the filter to the user device.

The filter may comprise a bloom filter.

The first processor may be further configured to receive a token time stamp and a time counter value from a user device.

The first processor may be further configured to choose the token time stamp or the time counter value as estimated time.

The first processor may be further configured to receive an entry or an exit token as a part of the challenge.

The first processor may be further configured to control the validity of the entry token.

The first processor is further configured to not update the filter if an exit token is received.

According to a second example aspect of the invention there is provided an apparatus comprising:
a second memory unit; and
a second input/output interface;
a second processor configured to:
send a challenge to a terminal; and
receive contents of a filter from the terminal; wherein
the contents of the filter include information derived from the sent challenge.

The filter may be a bloom filter.

The second processor may be further configured to receive a pair of tokens from a backend server; wherein the tokens comprise an entry token and an exit token.

The second processor may be further configured to receive a token time stamp from a backend server.

The second processor may be further configured to provide a time value counter; and to periodically update the value of the time value counter after receiving the pair of tokens. The second processor may be configured to update the value of the time value counter every second after receiving the pair of tokens. The updating of the value of the time value counter may increment the time value counter by an increment. The increment may be one.

The second processor may be further configured to send the value of the time value counter to a terminal.

The second processor may be further configured to send the filter contents to a backend server.

According to a third example aspect of the invention there is provided an apparatus comprising:
a third processor configured to:
receive contents of a filter from a user device; and
derive from the filter contents information concerning user behavior; wherein
the contents of the filter relate to a user device and to a terminal.

The filter may be a bloom filter.

The third processor may be further configured to send a pair of tokens to a user device.

The third processor may be further configured to send a token time stamp to a user device.

The third processor may be further configured to derive from the filter contents the identity of user devices that have not sent any challenge to a terminal.

The third processor may be further configured to derive from the filter contents identity of user devices from which the filter contents have not been received.

According to a fourth example aspect of the invention, there is provided a method comprising:
receiving a challenge from a user device;
updating a filter based on the challenge; and
sending the contents of the filter to the user device.

The filter may be a bloom filter.

The method may further comprise updating the bloom filter.

The method may further comprise receiving a token time stamp and time counter value from a user device.

The method may further comprise choosing the token time stamp or the time counter value as estimated time.

The method may further comprise receiving an entry or exit token as a part of the challenge.

The method may further comprise controlling the validity of the entry token.

The method may further comprise not updating the filter if an exit token is received.

According to a fifth example aspect of the invention, there is provided a method comprising:

sending a challenge to a terminal; and receiving contents of a filter from the terminal; wherein the contents of the filter include information derived from the sent challenge.

The filter may be a bloom filter.

The method may further comprise receiving a pair of tokens from a backend server; wherein the tokens comprise an entry token and an exit token.

The method may further comprise receiving a token time stamp from a backend server.

The method may further comprise providing a time value counter; and updating the value of the time value counter with one every second after receiving the pair of tokens. The method may further comprise updating the value of the time value counter every second after receiving the pair of tokens. The updating of the value of the time value counter may increment the time value counter by an increment. The increment may be one.

The method may further comprise sending the value of the time value counter to a terminal.

The method may further comprise sending the filter contents to a backend server.

According to a sixth example aspect of the invention, there is provided a method comprising:

receiving contents of a filter from a user device; and deriving from the filter contents information concerning user behavior; wherein the contents of the filter relate to user device and a terminal.

The filter may be a bloom filter.

The method may further comprise sending a pair of tokens to a user device.

The method may further comprise sending a token time stamp to a user device.

The method may further comprise deriving from the filter contents the identity of user devices that have not sent any challenge to a terminal.

The method may further comprise deriving from the filter contents identity of user devices from which the filter contents have not been received.

According to a seventh example aspect of the invention, there is provided a computer program, comprising:

code for performing a method of any example aspect of the invention, when the computer program is run on a processor.

According to an eight example aspect of the invention, there is provided a memory medium comprising the computer program of the seventh example aspect.

According to a ninth example aspect of the invention, there is provided a system comprising at least two of the device according to the first example aspect of the invention;

the device according to the second example aspect of the invention; and the device according to the third example aspect of the invention.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
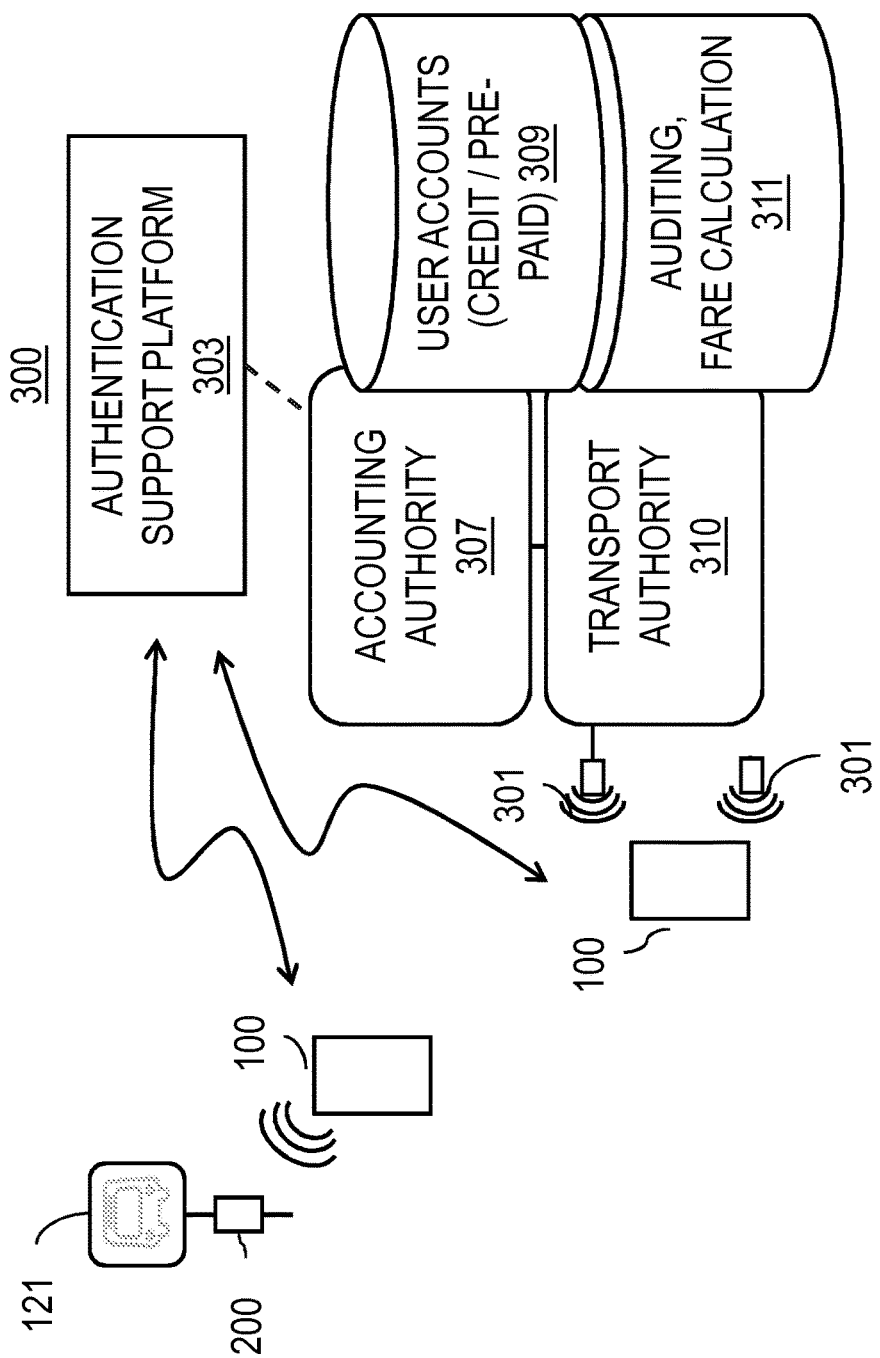
FIG. 1 shows a block diagram of the environment of identity based ticketing according to an example embodiment.

FIG. 1 shows a block diagram of the environment of identity based ticketing according to an example embodiment. A transport authority 310 system operates non-gated ticket readers, or terminals 200, for example onboard a vehicle 121 in connection with bus stops or the like. Some gated near-field communication (NFC) readers 301 are in an example embodiment connected, directly or indirectly to a backend system 300 of transport authority 310 and the authentication support platform 303 thereof. The readers 301, which are connected, can receive information which they refer to during user verification.

In some example embodiments, all or some of the information exchanged during a user verification is collected as transaction evidence and forwarded to a processing unit of the backend system 300 of the transport authority 310, such as a an accounting system 307, a fare calculation engine 311, or a combination thereof. The fare calculation engine 311 may be a database maintained by the transport authority 310. The parts 307, 309, 311 are in an example embodiment implemented as separate servers or as one or more combined servers. In the foregoing, all systems of the transport authority are referred to as the backend.

In an example embodiment, the transport authority 310 is responsible for distributing and maintaining the terminals 200, e.g. smart cards, for non-gated travel. In an embodiment these non-gated terminals are physically and firmly attached to their location and are assumed to be tamper-resistant.

In an example embodiment, the backend 300 of the transport authority 310 is responsible for fare collection from the users of devices 100. The backend 300 of the transport authority 310 can simultaneously be connected to several accounting authorities 307. Additionally, all users may have a relationship with at least one accounting authority 307, in the form of a prepaid or credit-based user account 309. In an example embodiment, user account statuses can be used for determining user history that can affect the services provided to the user.

In an example embodiment, the backend 300 of transport authority 310 is also responsible for generating ticketing credentials and provisioning secrets to the user devices 100. Furthermore, in an example embodiment, the accounting authority 307 is responsible for a cryptographic validation of transport evidence and user device and identity use statistics.

Figure 2:
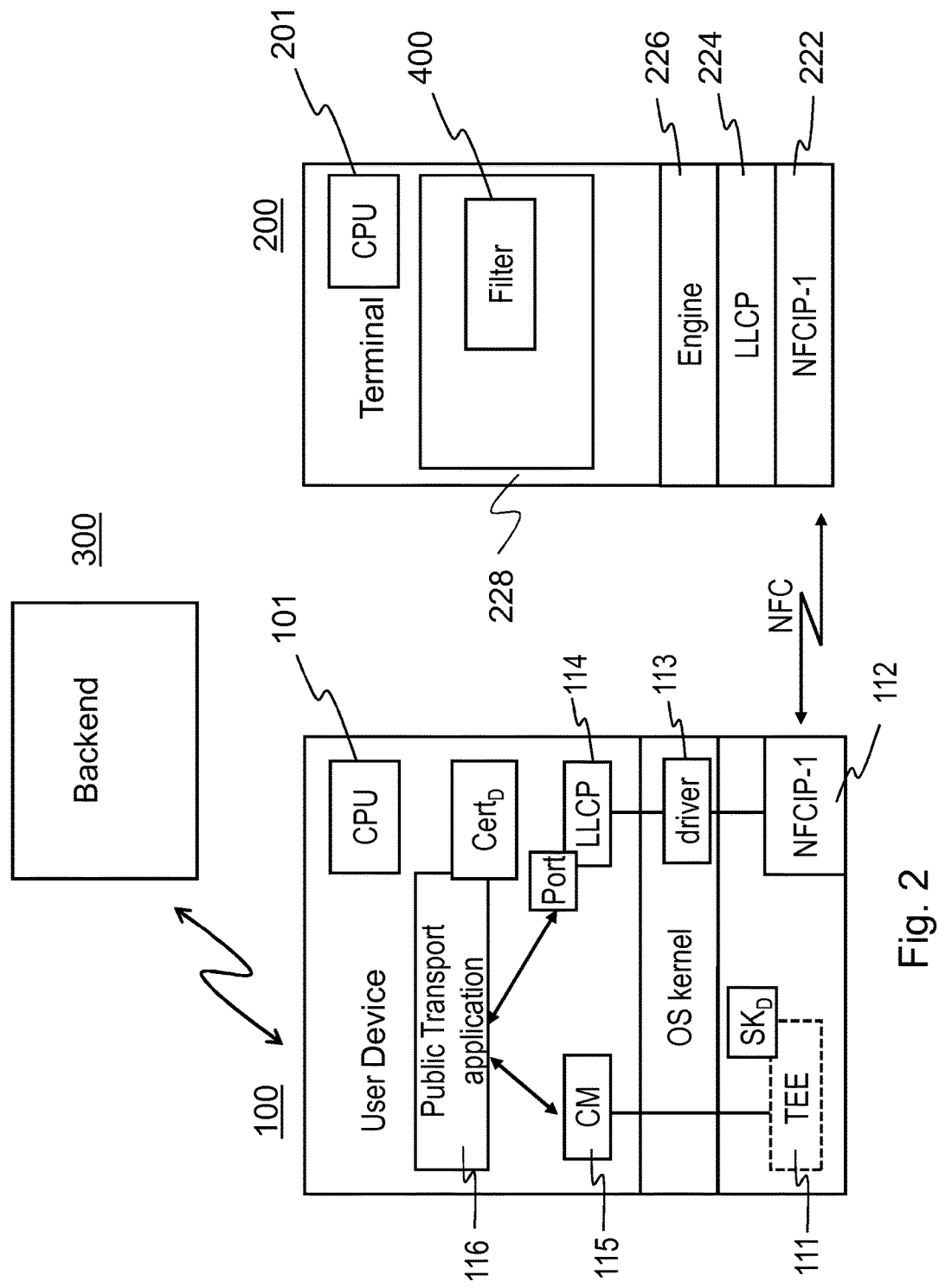
FIG. 2 shows an architectural overview of a system of an example embodiment.

FIG. 2 illustrates an architectural overview of a system suited for performing some example embodiments. The system comprises a user device 100 such as a smart phone and a reader, or terminal, 200. The user device 100 has at least intermittently access to a backend system 300, such as a server cluster or cloud. The terminal has at least indirectly, through user device 100, access to the backend system 300.

The user device 100 is, for example, a portable device such as a mobile phone, a portable gaming device, a chip card ticket, a navigator, a personal digital assistant, a tablet computer or a portable web browser. The device 100 generally has capabilities for processing information, for performing cryptographic operations and for communicating with other entities, such as the backend 300 and the terminal 200 at least intermittently when in contactless or contacting access with other entities, or with a related communication element.

The user device 100 has a processing circuitry for cryptographic operations, such as a processor 101. Some user devices have a secure environment processing circuitry such as an isolated Trusted Execution Environment (TEE) 111. The user device 100 further has a communication interface 112 such as a near field communication (NFC) interface, near field communication (NFC) interface driver 113, a Logical Link Control Protocol (LLCP) stack 114, a credential manager CM 115, i.e. an interface by which an operating system and/or applications can interact with the processing circuitry for cryptographic operations, and a public transport application 116.

The user device 100 further comprises, in some example embodiments, a user interface, a mobile communication circuitry, an application platform for enabling user installation of applications, and/or a battery for powering the apparatus. In some example embodiments, the user device is externally powered when used, e.g. with electromagnetic induction or with galvanic contacts.

The terminal 200 comprises a communication interface such as a near field communication interface 222, a Logical Link Control Protocol (LLCP) stack 224, an engine 226 that is a processing circuitry for controlling various authentication operations, and a memory 228 that comprises various data needed by the terminal 200 for its operations, including e.g. public authentication key(s). The terminal further comprises processing circuitry for cryptographic operations, such as processor 201, for example for maintaining and updating a filter 400 such as an arithmetic filter. In some example embodiments, the processing circuitry for cryptographic operations in the user device 100 and in the terminal 200 is isolated as a logically separate function using common hardware circuitries, i.e. a processor 101,201. In some example embodiments some or all logical elements of the processing circuitry are implemented with dedicated hardware elements. Further in some example embodiments the processing circuitry is implemented by using dedicated applications and common hardware circuitries.

The terminal 200 is in some embodiments a fixedly installed device at a gated or non-gated entrance of a public transport system. In some other embodiments, the terminal 200 is built into a portable device e.g. for use by ticket inspecting personnel.

The transport backend system 300 is, in some embodiments, a server that is operated by a service provider and that has communication capabilities for exchanging information directly or indirectly with the user device 100 and/or with the terminal 200. The server comprises a processor that is configured to perform its task.

In an example embodiment, the near field communications (NFC) interface 112 interfaces as provided by currently available hardware and various messages are size optimized. Data transaction between the user device 100 and the terminal 200, e.g. at transport station, is performed using Logical Link Control Protocol (LLCP) over NFC peer-to-peer communication mode. This use of LLCP over NFC can enable using link layer transport service classes, such as connectionless data transmission and connection-oriented data transmission.

In some example embodiments, one or more of the user device 100, the terminal 200 and the backend system 300 comprises or comprise other elements, such as user interface device, display, audio device or the like.

Figure 3:
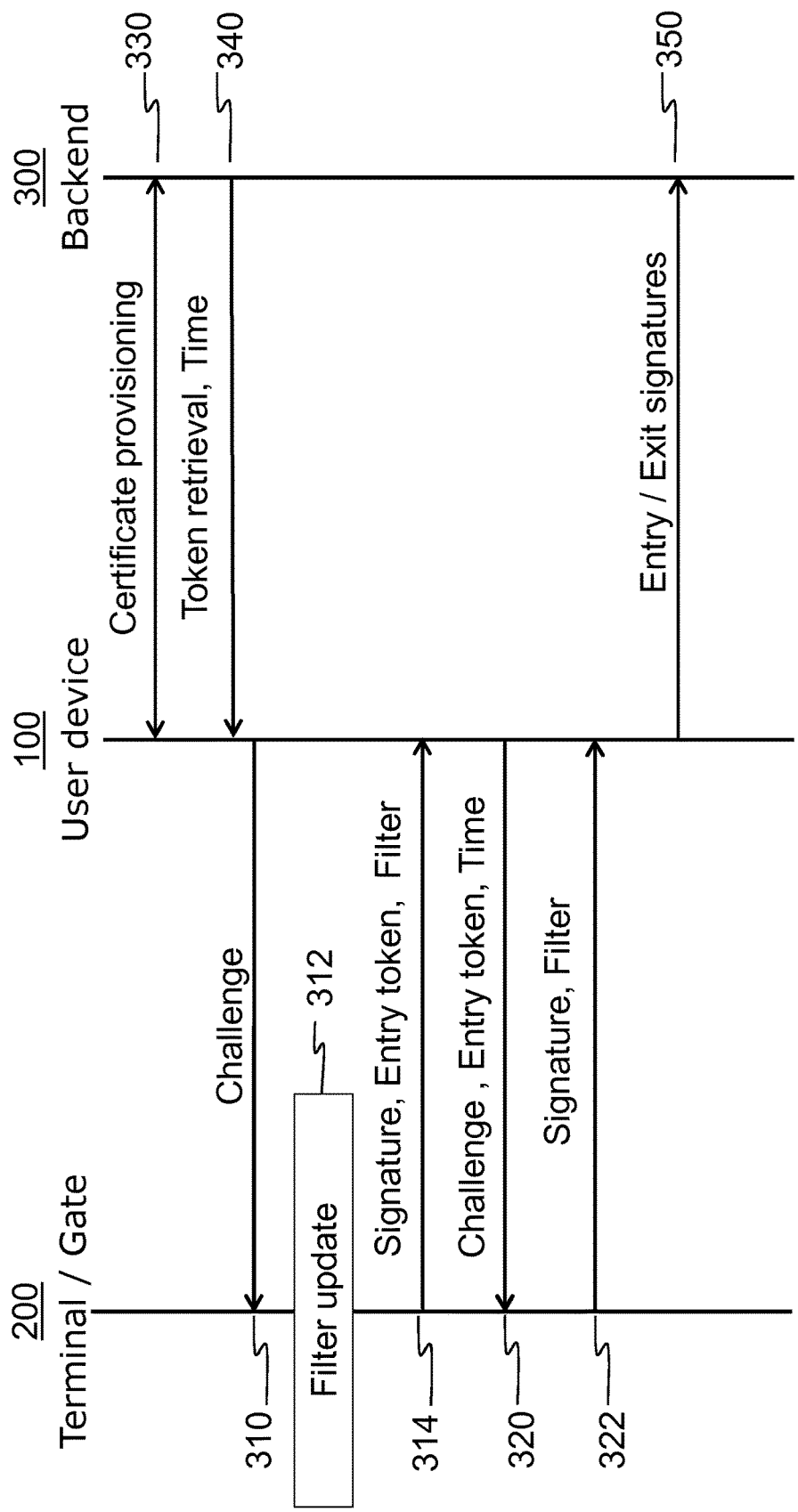
FIG. 3 shows a messaging architecture according to an example embodiment.

FIG. 3 shows a messaging architecture according to an example embodiment. Prior to commencing any travel with public transport using the identity based ticketing, the user device 100 communicates 330 with the backend system 300 in order to receive certificates necessary for the identity based ticketing according to an example embodiment. The backend 300 is accordingly involved at entries into the system. The user device 100 retrieves 340 a data element, or a token, from the backend system 300. The retrieved token relates to the account, or identity, of the user and contains cryptographic elements. The retrieved token is valid for a limited period of time, for example fifteen minutes. The user device 100 further receives the current time from the backend system 300. The user device further maintains a time counter value bound to the token retrieval. The value of said counter is periodically increased e.g. by one every second so as to provide a time value in seconds with respect to the time the token and/or other cryptographic elements were retrieved from the backend 300.

At the terminal 200, as the user is about to start using public transport and wishes to enter the system through a gated or a non-gated public transport station, the user device 100 and the terminal 200 communicate with each other. At the entry operation, the user device 100 sends 310 a challenge to the terminal 200, containing the entry token retrieved from the backend 300, the current value of the time counter, and the certificate. The certificate includes information on whether the user device has a secure environment, e.g. a TEE, or a non-secure environment. In an example embodiment, the certificate includes further information, for example information relating to the identity of the user, information on the validity of the certificate and/or cryptographic elements such as a public key.

The calculations required for the challenge are carried out prior to sending the challenge by the cryptographic processing circuitry, either in a secure environment or in a non-secure environment, of the user device 100. The terminal 200 receives the time estimate from the user device 100.

The time counter value allows the terminal to have a reasonable estimate of the time even without connectivity to the backend 300. The terminal uses either the time counter value of the user device 100 or the token provision time, which should be at most as outdated as the limited validity period of the token. In other words, the token provision time differs from the actual time at most by the validity period of the token.

At each entry operation 310, the terminal 200 logs an entry signature, token, or the certificate of each user device 100 into a filter 400 thus updating 312 the filter 400.

The terminal 200 used to enter the system, returns 314 an entry signature as a response to the challenge from the user device 200. The contents of the filter 400 are also returned to the user device 100 and are bound to the entry signature returned 314 by the terminal 200 as a response to the entry challenge 310 from the user device 100.

In an example embodiment, the value of the time counter of the user device is reported to the terminal 200 each time the user device 100 and the terminal 200 are in communication with each other. The user devices 100 are partially monitored through the estimate of time. The time estimate at least partially prevents the user devices from using copied tokens in parallel for entering the system. The time estimate of each terminal 200 should not be older than the validity period of the entry token, for example 15 minutes, and accordingly most parallel use is caught or detected at the backend 300.

As the user is about to finish his journey using public transport and wishes to exit the system through a gated or a non-gated public transport station, the user device 100 and a terminal 200 communicate with each other. At the exit operation, the user device 100 sends 320 a challenge to the terminal 200, containing the entry token signature and entry token time retrieved from a terminal 200 at the previous entry operation, the current value of the time counter, and a certificate. The certificate includes information on whether the user device has a secure environment, e.g. a TEE, or a non-secure environment.

The terminal 200 used to exit the system returns 322 an exit signature as a response to the challenge from the user device 200. The contents of the filter 400 are also returned to the user device 100 and are bound to the exit signature returned by the terminal 200 as a response to the exit challenge from the user device 100.

The user device 100 reports back to the backend 300 regularly 350 if it is possible to connect to the backend 300 and the user device 100 functions in an expected fashion, i.e. the user device or the identity thereof is not maliciously used. The user device 100 provides the backend 300 with the entry and/or exit signatures received from the terminal 200. These signatures contain the filter 400 values, which are used by the backend to retrieve information on user behavior. If the user device 100 fails to report the corresponding entry and exit signatures to the backend 300, the terminal 200 will anyhow be able to report the contents of the filter 400 to the backend 300 through further passengers and their user devices 100, or in some example embodiments through connectivity provided at the terminal 200.

A factor to consider in a ticketing system is the price of the travel for the passenger. In an example embodiment, the backend 300 assumes the maximum charge for any user device 100, and the user identity thereof, that retrieves a token from the backend 300. If the token is not used during the validity period, and no malicious behavior is established, the maximum charge is redeemed to the user. Otherwise, the actual user charge will be based on the entry and exit tokens reported to the backend 300.

Figure 4:
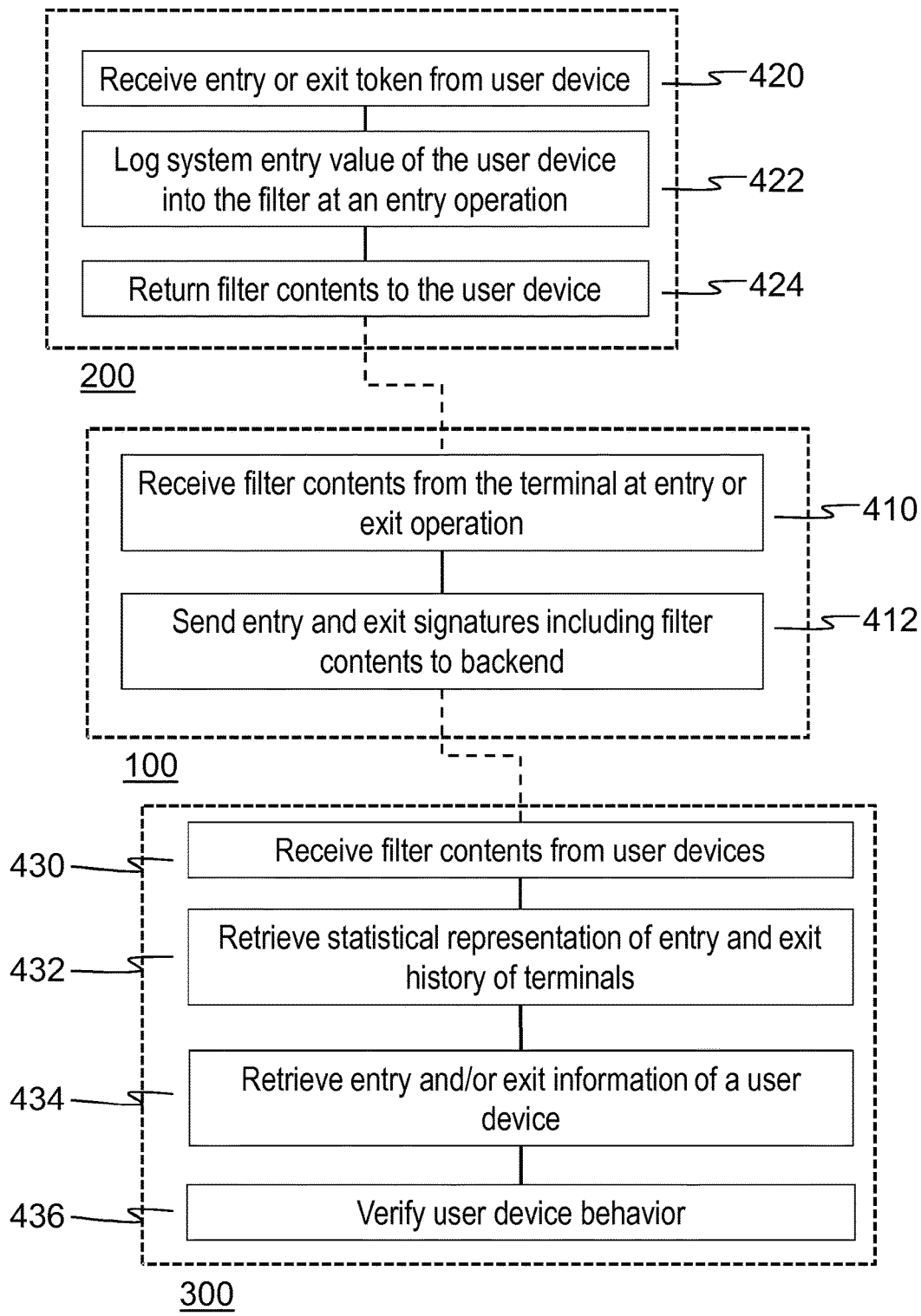
FIG. 4 shows a flow diagram of the operation of a filter according to an example embodiment.

FIG. 4 shows a flow diagram of the operation of the filter 400 according to an example embodiment of identity based ticketing. In an example embodiment, the filter 400 is a data structure configured to be used in testing whether an element is part of a set. In an example embodiment, the filter 400 is configured in such a way as to provide no false negative responses to a query of an element being a part of a set or not. That is, a system entry token that was not used to update the contents of the filter 400 is with certainty not a part of the filter 400. In an example embodiment the filter 400 is a Bloom filter. The contents of the filter 400 are returned to the user device 100 and bound to the signature returned as a response to the challenge from the user device 100.

The operation of the filter 400 is explained in relation to the terminal 200, the user device 100 and the backend 300. The terminal 200 receives an entry or exit token from the user device 100 entering or exiting the system. The system entry value of the entry token of the user device 100 is logged 422 into the filter 400, i.e. the data structure of the filter 400 is updated in such a way that the data structure contains the system entry value of the user device 100. In an example embodiment, the filter 400 is a bloom filter. In the bloom filter, the system entry value is fed to a predetermined number of hash functions in order to receive a corresponding number of bit array positions. The bits corresponding to the array positions are then set to one and thus the system entry value is logged into the filter 400.

The filter contents are returned 424 to the user device 100 at entry and exit, although the exit token is not used to update the filter 400. In an example embodiment, the user device communicates with two different terminal 200 at entry and exit and thus receives 410 the filter contents of two separate terminals. In an example embodiment, the user device 100 reports back to the backend 300. In other words, the user device 100 sends 412 the entry and exit signatures including the contents of the filter 400 to the backend 300.

In an example embodiment, if a user device has no connectivity, the backend will anyhow receive 430 the filter contents at some point. This is so because each user device 100 will have to communicate with the backend prior to receiving the entry and exit tokens needed for travel. At this point, the filter contents are also received by the backend. The filter contents of any terminal 200 contain all the system entry values of user devices 100 that have previously entered the system through the terminal in question. Thus, even if any user device 100 fails to send the filter contents to the backend 300, no information is necessarily missing from the backend.

The backend 300 receives the filter contents of all the terminals 200 and retrieves 432 from this information a statistical representation of entry and exit history of the terminals 200 of the identity based ticketing environment. Furthermore, in an example embodiment, the backend retrieves 434 from the statistical history, i.e. the filter contents of the terminals 200, information on entry and exit operations of a user device 100. The information retrieved 432,434 is used to verify 436 user device behavior. For example, the entry and exit operations that have not been reported to the backend 300 by a user device 100 are readily evident from the contents of the filter 400 of a terminal 200.

Some examples of different use cases of some example embodiments of the identity based ticketing are as follows. In a first use case, the identity based ticketing according to an example embodiment is applied in a public transport environment wherein the constant connectivity of user devices 100 or terminals 200 to the backend 300 cannot be guaranteed, i.e. the user devices 100 are offline for limited periods of time. The time value counter added to the user device gives the terminals an estimate of time, even if offline, and thus a parallel use of the same entry tokens or user identities can be effectively prevented, i.e. the users are not able to share a same ticket and travel with it.

In a second use case, the identity based ticketing according to an example embodiment is applied in an environment, wherein the user devices, or most of them, do not comprise a secure environment, such as a TEE, and accordingly all the cryptographic calculations done in the user device 100 are vulnerable to eavesdropping or a similar attack. A possibility exists that several user identities could be copied and used for travel. By applying the filter 400 and logging each entry operation of a user device 100, and the user identity thereof, into the filter 400, the backend 300 will receive usage history from the terminals 200 and can therefrom obtain information on the behavior of the user devices, thus catching or detecting user devices or identities of misbehaving user devices.

In a third use case, the identity based ticketing according to an example embodiment provides the user of the system with a user interface with which the customer can monitor his user identity and user account. As each user device communicates with the backend 300 prior to commencing travel in the public transport system, the backend 300 is involved at least in every second transaction, i.e. before each entry operation. Even if the user device 100 had been completely compromised, the backend 300 can monitor travel patterns using the time value counter, the contents of the filter 400, and by being involved in every second operation of the user device. The backend 300 can further provide the user a user interface, for example for the user device 100 or for any web browser. The user then increases the security of system by exercising self-control of the user account behavior.

Without in any way limiting the scope, interpretation, or application of the appended claims, a technical effect of one or more of the example embodiments disclosed herein is hindering malicious use of identities of users of insecure user devices. Another technical effect of one or more of the example embodiments disclosed herein is the ability to monitor account behavior without constant connectivity. Another technical effect of one or more of the example embodiments disclosed herein is providing a way of minimizing or at least reducing the costs incurred to a user caused by malicious use of her user account.

It will be understood that each operation of the flowchart, and/or combinations of operations in the flowchart can be implemented by various means. Means for implementing the operations of the flowchart, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the afore-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one non-transitory memory including computer program code,
   the at least one memory and the computer program code are configured to, with the at least one processor, cause the apparatus to:
   update a filter based on a challenge received at a terminal of a transport system from a user device, wherein the challenge comprises an entry token from the user device, a token time stamp, and a time counter value associated with the entry token;
   in response to receiving the token time stamp and the time counter value from the user device, choose at least one of: the token time stamp and the time counter value as estimated time;
   validate the entry token based at least on the estimated time; and
   send contents of the filter and a signature of the entry token to the user device, wherein the contents of the filter are bound to the signature of the entry token.

2. The apparatus according to claim 1, wherein the filter is a bloom filter.

3. The apparatus according to claim 1, wherein the at least one memory and the computer program code are further configured to, with the at least one processor, cause the apparatus to:
   control a validity of the entry token.

4. The apparatus according to claim 1, wherein the at least one memory and the computer program code are further configured to, with the at least one processor, cause the apparatus to:
   not update the filter if an exit token is received at the terminal of the transport system; and
   send contents of the filter and a signature of the exit token, wherein the contents of the filter are bound to the signature of the exit token.

5. An apparatus comprising:
   at least one processor; and
   at least one non-transitory memory including computer program code,
   the at least one memory and the computer program code are configured to, with the at least one processor, cause the apparatus to:
   receive a pair of tokens from a backend server of a transport system, wherein the tokens comprise an entry token and an exit token;
   periodically update a value of a time value counter associated with the entry token;
   send a challenge to a terminal of a transport system comprising the entry token and the value of the time value counter associated with the entry token;
   receive contents of a filter and a signature of the entry token from the terminal of the transport system, the entry token being validated based at least on the time counter value, wherein the contents of the filter are bound to the signature of the entry token; and
   send at least the received contents and the signature to the backend server of the transport system.

6. The apparatus according to claim 5, wherein the filter is a bloom filter.

7. The apparatus according to claim 5, wherein the at least one memory and the computer program code are configured to, with the at least one processor, cause the apparatus to:
receive a token time stamp from a backend server.

8. The apparatus according to claim 5, wherein the value of the time value counter is updated every second after receiving the pair of tokens.

9. The apparatus according to claim 5, wherein the updating of the value of the time value counter increments the time value counter by an increment.

10. The apparatus according to claim 5, wherein the at least one memory and the computer program code are configured to, with the at least one processor, cause the apparatus to:
send the filter contents to a backend server of the transport system.

11. An apparatus comprising:
at least one processor; and
at least one non-transitory memory including computer program code,
the at least one memory and the computer program code are configured to, with the at least one processor, cause the apparatus to:
send different pairs of tokens and token time stamps from a backend server of a transportation system to a plurality of user devices, wherein each pair of tokens comprise an entry token and an exit token;
receive contents of a filter for different terminals of the transportation system, entry signatures, and exit signatures from at least some of the plurality of user devices; and
derive information from the contents of the filter for each of the different terminals concerning user behavior between the plurality of user devices and the respective terminals; wherein the contents of the filter for the different terminals are bound to at least one of an entry signature and an exit signature based on at least one of:
an entry operation of a given one of the user devices and the terminal that uses the entry token; and
an exit operation of the given user device and the terminal that uses the exit token.

12. The apparatus according to claim 11, wherein deriving the information comprises:
deriving the identity of user devices that have not sent any challenge to a terminal.

13. The apparatus according to claim 11, wherein deriving the information from the filter contents comprises:
deriving identity of user devices from which the filter contents have not been received.

14. The apparatus according to claim 1, wherein the terminal is either fixedly installed at a gated or non-gated entrance of the transport system.

15. The apparatus according to claim 1, wherein the challenge is received by the terminal from the user device over a near-field communication interface.

* * * * *